June 22, 1943.  G. E. BRANDON  2,322,504
BARGE LOADING AND UNLOADING APPARATUS
Filed Sept. 28, 1940  5 Sheets-Sheet 1
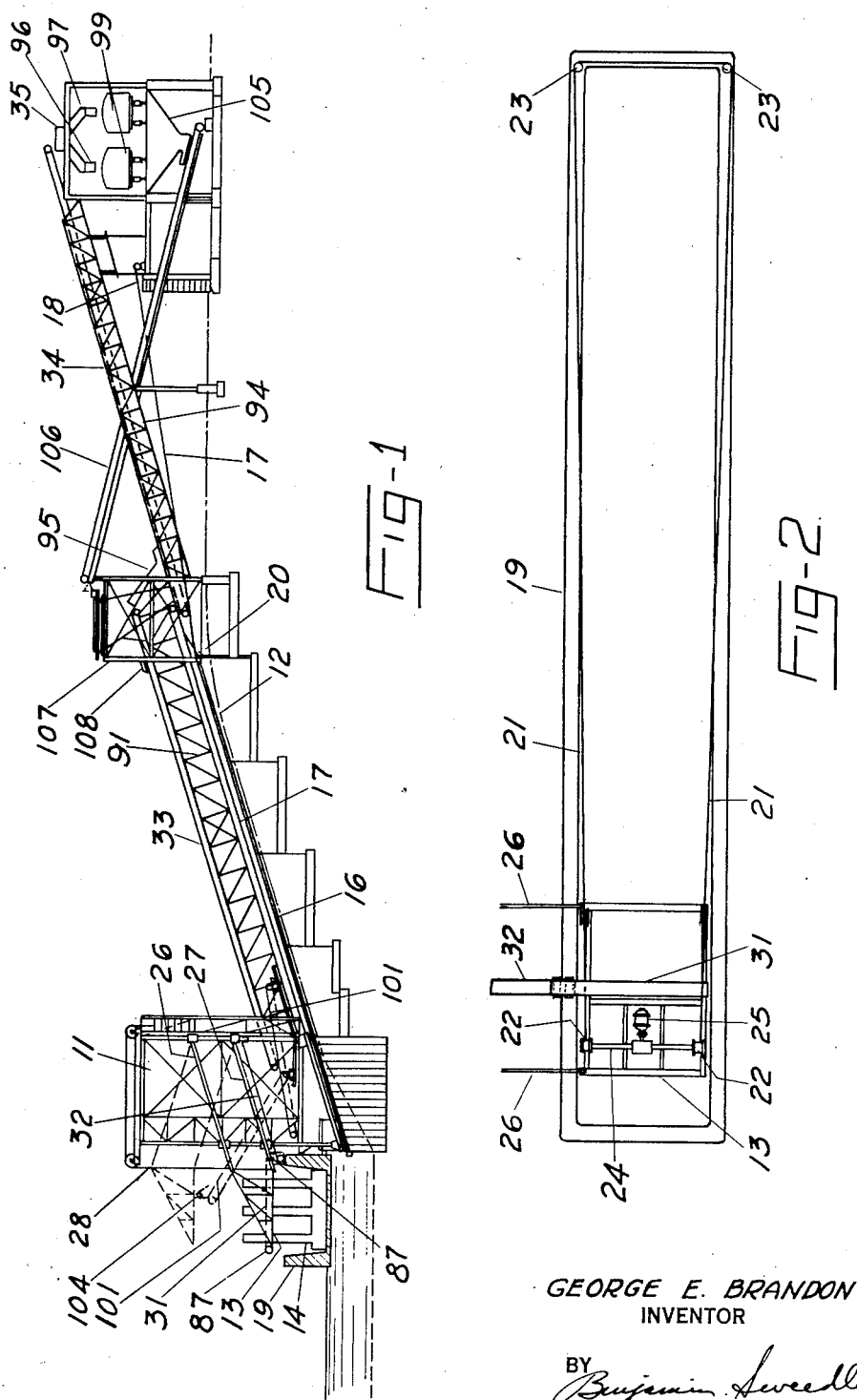
GEORGE E. BRANDON
INVENTOR
BY
ATTORNEY

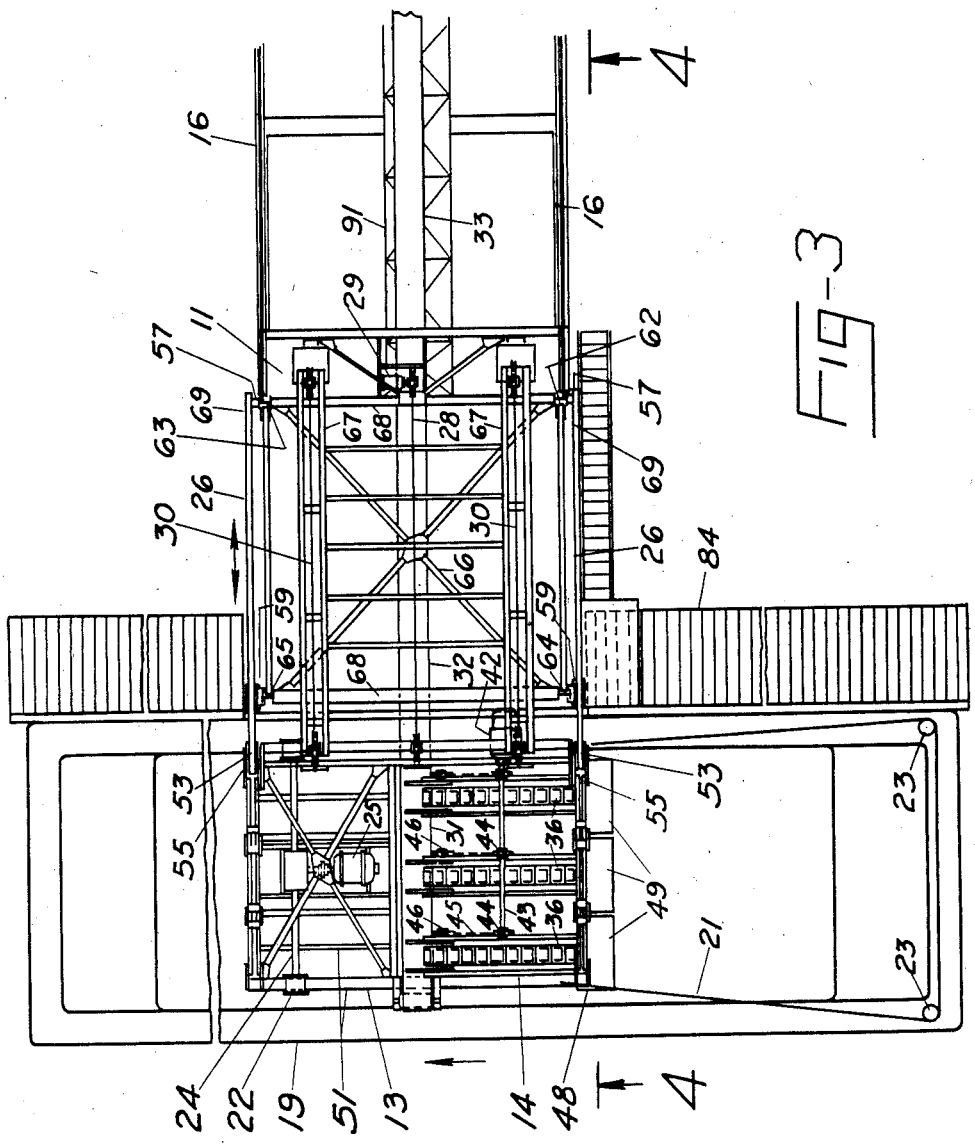

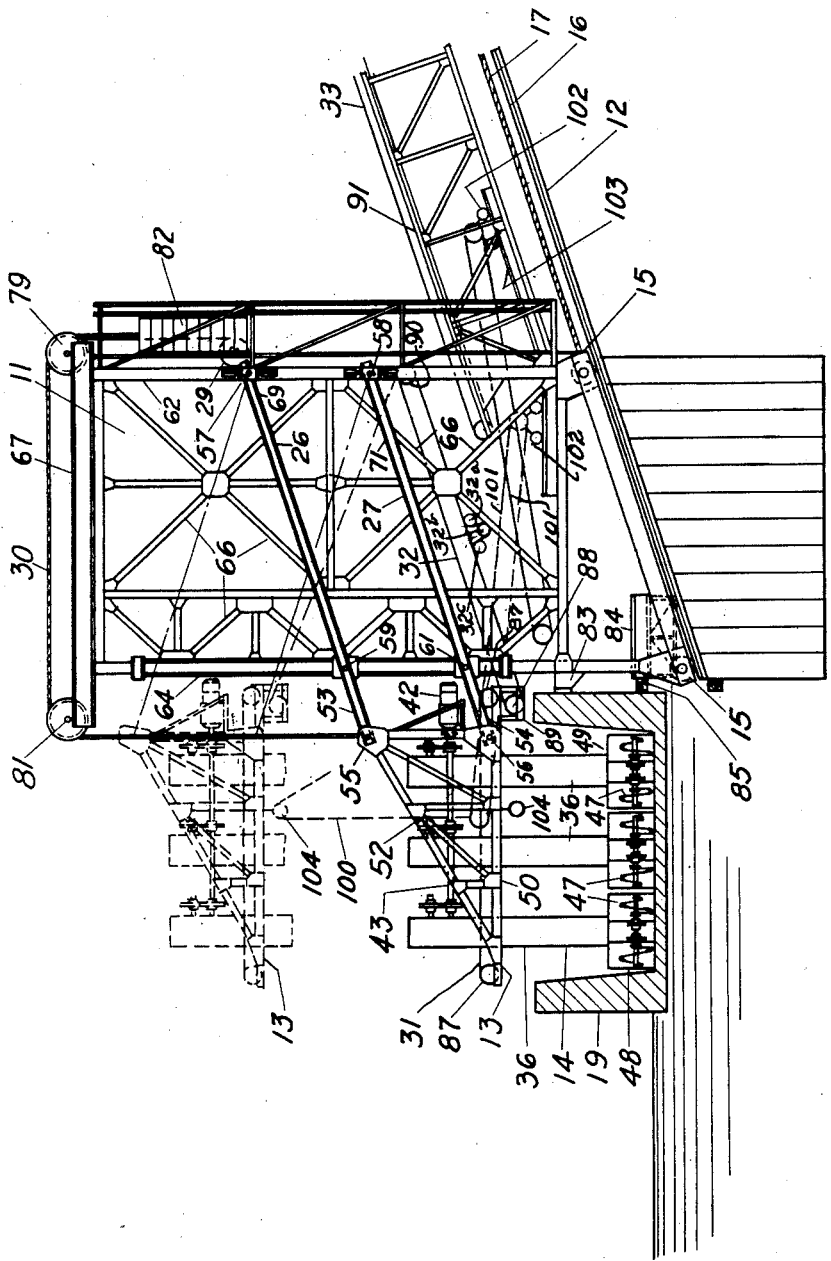

June 22, 1943.  G. E. BRANDON  2,322,504
BARGE LOADING AND UNLOADING APPARATUS
Filed Sept. 28, 1940  5 Sheets-Sheet 4

GEORGE E. BRANDON
INVENTOR

BY *Benjamin Aweedler*
ATTORNEY

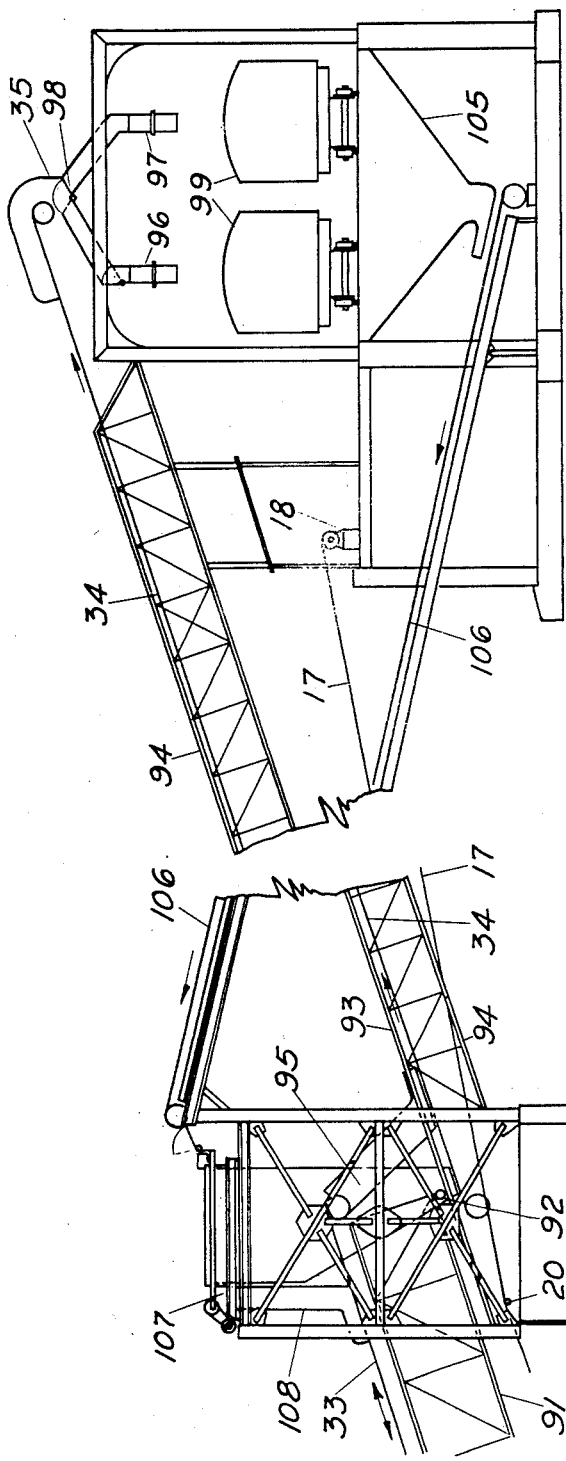

Patented June 22, 1943

2,322,504

UNITED STATES PATENT OFFICE 2,322,504

BARGE LOADING AND UNLOADING APPARATUS

George E. Brandon, New York, N. Y., assignor to Semet-Solvay Engineering Corporation, New York, N. Y., a corporation of New York Application September 28, 1940, Serial No. 358,804

4 Claims. (Cl. 214—14)

This invention relates to apparatus for unloading barges, and particularly to apparatus for unloading coal or coke barges on bodies of water where the shore-line changes with the rise and fall of the water level as, for example, due to the ebb and flow of the tides.

Machines heretofore proposed for removal of material from barges have involved a bucket conveyor (U. S. Patent 1,422,926, granted July 18, 1922) or a clam-shell bucket which can be moved about to reach and pick up material from the barge. The unloading apparatus of Patent 1,422,926 involves a carrier movable in a path along the side of a barge, i. e. parallel to the side of the barge, and a complicated mounting connecting the bucket conveyor to the carrier and permitting movement of the conveyor about a vertical axis so that the conveyor can be moved into all corners of the barge. Apparatus of this type requires constant supervision to direct the conveyor and cannot be used where the rise and fall of the water level changes the shore-line, since the path traveled by the carrier would at times be submerged and at other times would be at a distance too far from the barge to permit unloading.

The clam-shell bucket type of unloader ordinarily involves a crane or similar device projecting out over the barge to be unloaded. The clam-shell bucket is suspended from the crane and is operated to pick up material from the barge and deposit it at any desired point. The operation of the crane and clam-shell type of apparatus requires continuous attention and a high degree of skill to remove material at a reasonable speed. Even when skillfully operated the clam-shell bucket inevitably scars the sides and bottom of the barge. Also, the clam-shell bucket leaves a considerable quantity of material in the barge, which causes delay and expense since the remaining material must be removed by hand.

It is an object of the present invention to provide apparatus for unloading barges which requires only a minimum of control and which will operate to remove substantially the entire charge of material without scarring the barge.

It is an additional object to provide an apparatus comprising a bucket conveyor which is operable to unload barges notwithstanding changes in water level causing changes in the shore-line. Other objects and advantages will in part be obvious from, and in part be described in, the following specification.

According to my invention, I provide an apparatus for unloading barges comprising an unloading or terminal tower near the shore-line on a bank of a body of water, a bucket conveyor or unloader carried by the tower, and a device to move a barge to be unloaded past the tower. The tower is movable up and down, preferably along a sloping path at right angles to the keel or side of the barge, on the bank of the body of water to a position, determined by the water level, in which a barge may pass beneath the bucket conveyor. The bucket conveyor is mounted on the tower for movement down into the barge and for movement up out of the barge. The bucket conveyor feeds to a delivery conveyor which in turn delivers the material to a cooperating conveyor system, the delivery conveyor and the conveyor system being constructed and designed so that when the bucket conveyor is positioned to remove material the discharge end of the delivery conveyor at any and all water levels is properly disposed to discharge the material onto the conveyor system, which deposits it at a desired point.

In the preferred embodiment illustrated in the drawings the invention is shown incorporated in a barge unloading apparatus comprising a bucket-type unloader pivotally connected to parallel arms which are slidably and pivotally connected to an unloading tower to provide for vertical movement of the unloader in a path in fixed relation to the tower, and the present description will be confined to the present illustrated embodiment of the invention. It will be understood, however, that the novel features and improvements are susceptible to other applications such, for example, as apparatus wherein the unloader is slidably connected directly to the tower. Hence, the scope of this invention is not confined to the embodiment herein described.

In the drawings,

Figure 1 is a side elevation of a preferred form of the apparatus showing the machine of my invention in position to unload material from a barge near the shore-line;

Figure 2 is a diagrammatic plan view of a barge and the apparatus employed to move the barge past the unloading machine;

Figure 3 is a fragmentary plan view showing the unloading apparatus positioned to remove material from the barge;

Figure 4 is a fragmentary sectional elevation taken on the line 4—4 of Figure 3 showing the unloading apparatus positioned to remove material from the barge;

Figure 11 is a fragmentary side view illustrating the transfer of material from one conveyor to another in my apparatus; and Figure 12 is a fragmentary side view of the delivery end of my unloading apparatus.

Figures 6, 7:
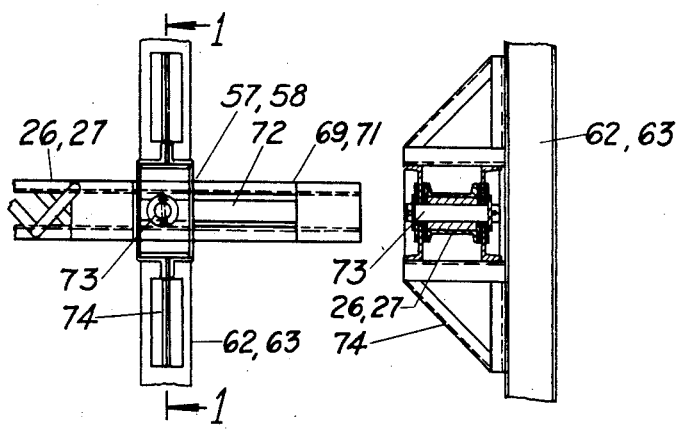
Figure 6 is a detail side view showing the connection between an arm supporting the mounting for the bucket-type unloader and one of the rear uprights of the terminal tower.
Figure 7 is a section taken along the line 1—1 of Figure 6.

Figures 1 to 4 show barge unloading apparatus comprising an unloading tower 11 located on the bank 12 of a river or other body of water whose shore-line changes with rise and fall of the water level. The tower 11 carries a platform or support 13 and a bucket-type unloader 14 mounted on the platform or support 13, and is movable on rollers 15 along tracks 16 in a sloping path substantially at right angles to the shore-line. Cable 17, connected to tower 11, is wound or paid out by motor-driven drum 18 to move the tower 11 to a position, determined by the water lever, in which a barge 19 can pass underneath the unloader 14. A pulley 20 is provided (Figure 11) to keep cable 17 above the bank 12, i. e. above the surface of the ground.

The barge 19 may be moved slowly beneath the unloader 14 by a cable 21 (Figure 2) connected between a pair of drums 22 mounted on the platform 13 and the niggerheads 23 on the barge 19. The drums 22 are rotated to wind up the cable 21 by a shaft 24 which is driven by motor and speed reducer assembly 25, also mounted on platform 13; thus the barge is moved slowly at right angles to the path of movement of the tower 11.

The platform 13 is connected to the tower 11 by arms 26 and 27 (Figures 3 and 4) and is movable up and down in a substantially vertical direction by cable 28 and motor 29 so that the unloader 14 may be lowered to pick up a strip of material from a barge 19 moving beneath it and may be raised up out of the barge. The material picked up by the unloader 14 is received by a conveyor 31 and is carried successively by conveyors 32, 33 and 34. From the conveyor 34 the material is discharged to a chute 35 for further handling.

Figure 5:
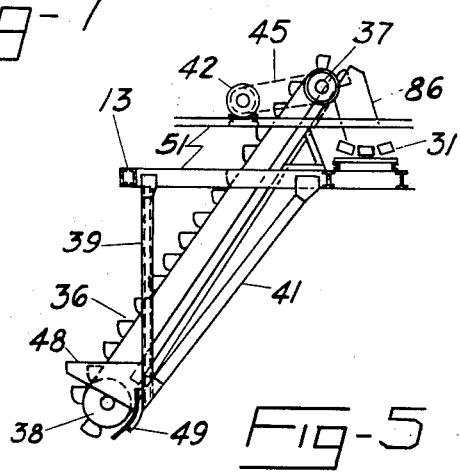
Figure 5 is a detail front view showing the mounting of a bucket-type unloader forming part of the unloading apparatus.

As shown in Figures 3, 4 and 5, the unloader 14 comprises a plurality of bucket conveyors 36 carried by and extending down from the platform 13. A pulley 37 on the platform 13 (Figure 5) carries the upper end of each bucket conveyor 36. The lower end of a conveyor chain passes around a pulley 38 supported from platform 13 by members 39 and 41. The conveyors 36 are arranged side by side in a line at right angles to the path of the barge 19 and are operated by a motor 42 (Figure 3) which rotates a shaft 43 and sprockets 44 thereon to drive the upper pulleys 37 through chains 45 (Figure 5) and sprockets 46 (Figure 3). The lower pulleys 38 are rotated by the conveyors 36 and are mounted on the same shaft as the spiral or helical members 47 (Figure 4) which feed material to the bucket conveyors 36. Thus the helical members 47 and pulleys 38 are both driven by the conveyors 36. Guard members 48 and 49 (Figures 4 and 5) are carried by the members 39 and 41 and are positioned around the spiral members 47 and bucket conveyors 36 to protect the bottom and sides of the barge 19. The spiral members 47 and bucket conveyors 36 constituting the unloader 14 are constructed to pick up a strip of material the width of the barge from a barge 19 moving thereunderneath.

As appears from Figures 3 and 4 the platform 13 to which the unloader 14 is fixed comprises the beams 50, the cross bracings 51, and the truss members 52 which extend upward and at an angle to the beams 50 forming a cantilever truss. The platform 13 is held in horizontal position and is connected to the tower 11 by two pairs of vertically spaced parallel arms 26 and 27. The ends 53 of the arms 26 are pivotally connected to the truss members 52 at 55, and the ends 54 of the arms 27 are pivotally connected to the beams 50 at 56. The arms 26 and 27 are slidably connected to the tower 11 by the connections 57, 58, 59 and 61 hereinafter described.

The tower 11 comprises uprights 62, 63, 64 and 65 arranged at the corners of a rectangle and held in fixed relationship with each other by truss members 66 and cross beams 67 and 68 (Figures 3 and 4). The connections 57 and 58 slidably and pivotally connect the ends 69 and 71 of the arms 26 and 27 to the uprights 62 and 63 which are farthest from the platform 13. Each connection 57 and 58 (Figures 6 and 7) comprises a slot 72 in the ends 69 and 71 of the arms 26 and 27, which slidably engages a pin 73 carried by a bracket 74 on the uprights 62 and 63. The connections 57 and 58 permit lateral movement of the ends 69 and 71 of the arms 26 and 27, but not vertical movement. Since the other ends 53 and 54 of the arms 26 and 27 are maintained in vertically spaced relation by the connections 55 and 56 to the platform 13, the arms 26 and 27 are maintained parallel at all times. The connections 57 and 58 also serve as centers of rotation for the arms 26 and 27 to give a relatively long radius so that platform 13 may be moved up and down a considerable distance while the arms 26 and 27 rotate through only a small angle.

Figure 9:
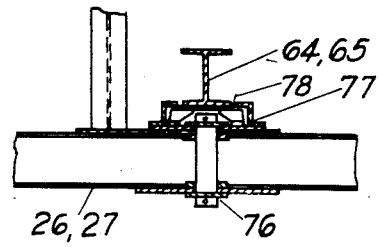
Figure 9 is a section taken along the line 2—2 of Figure 8.
Figure 10:
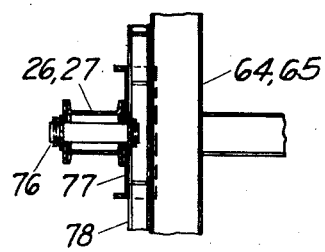
Figure 10 is a section taken along the line 3—3 of Figure 8.
Figure 8:
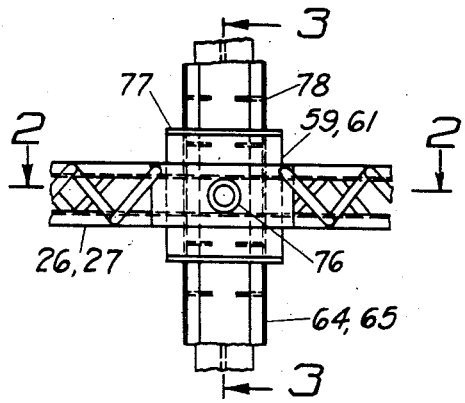
Figure 8 is a detail side view showing the connection between a supporting arm and one of the front uprights of the tower.

The connections 59 and 61 (Figures 8, 9 and 10) slidably and pivotally connect the arms 26 and 27 intermediate their ends and at equal short distances from the ends 53 and 54 to the uprights 64 and 65. Each connection 59 and 61 comprises a pin 76 and a shoe 77. The shoes 77 are formed to slide up and down on tracks 78 carried by the uprights 64 and 65, and the pins 76 are pivotally mounted in the arms 26 and 27. Thus connections 59 and 61 permit vertical movement of the arms 26 and 27 but not lateral movement. The distances from the uprights 64 and 65 along arms 26 and 27 to the points 55 and 56 where the arms 26 and 27 are connected to platform 13 are thus maintained equal; and since the arms 26 and 27 are kept parallel, as hereinabove explained, the platform 13 will be held in horizontal position by the arms 26 and 27 during any up and down movement.

It will be noted that up and down movement of the platform 13 effected by motor 29 actuating the cable 28 as hereinabove described is in a substantially vertical path in fixed relation to tower 11 since the connections 59 and 61 prevent lateral movement of the arms 26 and 27. Further, the pin and slot or lost motion connections 57 and 58 permit movement of the ends 69, 71 of arms 26, 27, thereby minimizing lateral movement of the platform 13. Lastly, the angle moved by the arms 26 and 27 is slight, hence there is no appreciable lateral movement of the platform 13 which movement, if appreciable, would have a tendency to injure the barge walls. The weight of the platform 13 is counterbalanced by a counterweight 82 connected by cable 30 (Figure 4) running over pulleys 79 and 80 mounted on beam 67 at the top of the tower 11.

The uprights 64 and 65 (Figures 3 and 4) of the tower 11 are provided with guides 83 which maintain a barge 19 moving past the tower 11 in a path at right angles to the path of the tower and in fixed relationship to the tower, directly beneath the unloader 14. Floats 84 are fixed to and movable with tower 11 and extend at the side of the path of the barge 19. The floats carry buffers 85 which hold the barge 19 against tipping or rocking during unloading. By reason of the substantially vertical movement of the platform 13 in a path in fixed relation to the tower 11 and the path of the barge 19 also in fixed relation to the tower 11, the unloader 14, even though its width is substantially equal to that of the interior of the barge 19, may be lowered to pick up a strip of material and raised without scarring the sides of the barge 19.

The material picked up by the unloader 14 is transferred to the first conveyor 31 of the conveyor system through chute members 86 (Figure 5) which are fixed to the platform 13 adjacent the upper ends of the bucket conveyors 36. The conveyor 31 travels over pulleys 87 (Figure 4) carried by the platform 13 and moves at right angles to the path of the barge 19. The second conveyor 32 of the system travels over a pulley 88 carried by a bracket 89 fixed to the platform 13 so that the material receiving end of conveyor 32 is maintained in fixed relation to the discharge end of the conveyor 31 to receive material therefrom in any position to which conveyor 32 may be moved by movement of the platform 13. The other end of conveyor 32 travels over a pulley 90 which is fixed to the tower 11. Suitable means such as conventional take-up rolls 32a, 32b, and 32c (Fig. 4), may be provided to take up slack in the conveyor 32 when the platform 13 is raised or lowered.

The third conveyor 33 of the system is supported by a beam 91 (Figures 4 and 11) in position to receive material from conveyor 32. The beam 91 extends parallel to the path of movement of the tower 11 and is fixed thereto for movement therewith toward and away from the shore-line. The end of the beam 91 remote from tower 11 is mounted on rollers 92 (Figure 11). The rollers 92 are movable on tracks 93 supported by a fixed beam 94 which also extends parallel to the path of movement of the tower 11. This beam 94 is disposed on the shore at a point well above the highest water level. The fourth conveyor 34 of the system extends along the beam 94 and is positioned beneath the end of the beam 91 and conveyor 33. A chute 95 fixed to the end of beam 91 transfers material from conveyor 33 to conveyor 34 in any position to which the conveyor 33 may be moved by movement of the tower 11. The conveyor 34 discharges the material to a chute 35 for further handling. As shown in Figure 12, chute 35 may be divided into two branches 96 and 97, and a two-way gate 98 may be provided to direct material through either branch to either car 99.

Two additional conveyors, identified by the reference characters 101 and 106, are provided for use in loading the barge. One end of the conveyor 101 is mounted on rollers 102 moving on a track 103 extending beneath beam 91. The conveyor 101 is moved to the dotted-line position shown in Figure 4, when it is desired to load a barge by means of a cable 100 connected to the conveyor 101 and passing over a pulley 104 fixed to the platform 13. A hopper 105 (Figure 12) discharges material, for example coke, to be loaded onto the conveyor 106 which carries the material to a sorting screen (not shown) on a transfer tower 107. Fine material is screened from the material to be loaded and the remainder of the material is discharged from the screen through chute 108. Chute 108 is located over conveyor 33 at a point such that movement of the tower 11 and conveyor 33 necessitated by change of water level only moves conveyor 33 back and forth under chute 108 and does not move it from position to receive material from chute 108. Conveyor 33 is operated in a direction reverse to that in which it is operated during unloading operations so that the material is carried from the transfer tower 107 to the end of the conveyor 33 at the tower 11. The conveyor 101 receives material from the conveyor 33 and discharges it to a barge 19 beneath the end of the conveyor 101, which is moved past the tower 11 as in the unloading operations.

The operation of my apparatus for unloading a barge is as follows:

Unloading tower 11 is moved up or down on the bank of a body of water along the sloping path provided by tracks 16 to a position determined by the water level where the platform 13 and unloader 14 fixed thereto project over water in which a barge can pass. The unloader 14 is then raised, if it has not already been raised, to a position where it will not interfere with movement of a barge 19 beneath it. A barge 19, containing, for example, coal to be unloaded, is moved to put one end thereof beneath the unloader 14 and position the sides of the barge 19 against the guides 83 and buffers 85. Cable 21 is passed over the niggerheads 23 on the barge 19 and secured to the drums 22 on the platform 13. The drums 22 are operated to wind up the cable 21 and move the barge 19 slowly, e. g., about ninety feet per hour, beneath the unloader 14 in a path determined by the guides 83 and buffers 85 in fixed relation to the tower 11 and at right angles to the tracks 16. Where there is current the barge 19 is preferably moved against the current.

The platform 13 is lowered substantially vertically to move the unloader 14, which is substantially as wide as the interior of barge 19, down to pick up a strip of material from the barge which is moving therebeneath. The platform 13 is raised to lift the unloader 14 out of the barge 19 when the end of the barge reaches a position adjacent the unloader 14. Since the barge 19 is guided in a path in fixed relation to the tower 11 by guides 83 and cable 21, and the unloader 14 moves up and down in a substantially vertical path and is held in fixed relation to tower 11 by arms 26 and 27, there is substantially no lateral relative movement between the unloader 14 and the barge 19 when the unloader is raised or lowered so that the walls of the barge 19 are not scarred. All of the material in the barge 19 may be picked up cleanly and without damage to the walls of the barge in one passage beneath the unloader 14, but if desired the material may be unloader in two or more successive strips of the barge beneath the unloader.

The material picked up by the unloader 14 is transferred by chutes 86 to the conveyor 31 mounted on the platform 13. The second conveyor 32, which has one end fixed to the platform 13 and the other end fixed to the tower 11, receives material from conveyor 31 in any position to which that conveyor may be moved by platform 13, and delivers it to the third conveyor 33. Conveyor 33 carries the material to the chute 95 carried by beam 91 at a fixed distance from the tower 11. Chute 95 is the transfer point where the material is transferred from conveyor 33 to the fourth conveyor 34 which carries it to chute 35.

When the water level charges, the tower 11 is moved to a new position where a barge 19 again can pass beneath the unloader 14. Unloader 14 and conveyors 31 and 32 function as before. Conveyor 33 and chute 95 are moved with the tower 11 relative to fixed conveyor 34 and transfer material to conveyor 34 in any position to which the conveyor 33 and chute 95 may be moved.

Thus it will be noted my invention provides apparatus involving the use of bucket unloaders which apparatus is operable to unload barges and to convey the material unloaded to a determined point notwithstanding changes in water level and accompanying changes in shore-line. The apparatus requires only a minimum of control to effect a thorough removal of material from a barge and removes the material at a high rate. Moreover, this complete and rapid removal is effected without scarring the sides of the barge by the unloader because both barge and unloader are connected to an unloading tower which moves them in paths which are in fixed relation to the tower.

I claim:

1. Apparatus for unloading material from a barge which comprises a tower, a support mounted on the tower for movement in a substantially vertical path, a bucket conveyor carried by said support, means to move the tower in a sloping path on a bank of a body of water to a position in which a barge can pass underneath the bucket conveyor, means to move a barge beneath the bucket conveyor, means to lower said support to position the bucket conveyor to pick up a strip of material from a barge moving therebeneath and to raise the support, a conveyor mounted on the support to receive material from the bucket conveyor, a second conveyor having one end in fixed relation to the first conveyor to receive material therefrom and the other end in fixed relation to the tower, a third conveyor fixed to and movable with the tower to receive material from the second conveyor and carry it to a transfer point at a fixed distance from the tower, and a fourth conveyor extending beneath and substantially parallel to the path traveled by the transfer point during movement of the tower and adapted to receive material from the third conveyor and convey it to a predetermined discharge point.

2. Apparatus for unloading material from a barge which comprises a tower on a bank of a body of water, said tower comprising a pair of laterally spaced uprights, a pair of vertically spaced parallel arms of equal length, a substantially horizontal platform pivotally connected to the arms at one end, sliding connections between one of said uprights and the arms adjacent the other end of the arms and sliding connections between the second upright and the arms intermediate the ends of the arms whereby the platform is maintained horizontal and is movable in a substantially vertical direction, a bucket conveyor fixed to said platform, means to move a barge to be unloaded beneath said bucket conveyor, means for lowering said platform to position the bucket conveyor to take up a strip of material from the moving barge and to raise the platform, a conveyor mounted on the platform to receive material from the bucket conveyor, and a second conveyor with one end in fixed relation to the end of the first conveyor to receive material therefrom and with the other end in fixed relation to the tower.

3. Apparatus for unloading material from a barge which comprises four uprights arranged at the corners of a rectangle and forming a tower, two pairs of vertically spaced parallel arms of equal length, a substantially horizontal platform pivotally connected to the arms at one end, sliding conenctions between the arms and two adjacent uprights adjacent the other end of the arms constructed for lateral movement of the arms but not vertical movement and sliding connections between the remaining two uprights and the arms intermediate the ends of the arms constructed for up and down movement of the arms but not lateral movement whereby the platform is maintained horizontal and is movable in a substantially vertical direction, a bucket conveyor fixed to said platform, means to move the tower in a sloping path on a bank of a body of water to a position so related to the water level that a barge can pass beneath the bucket conveyor, means to move the barge beneath the bucket conveyor, means to lower said platform to position the bucket conveyor to pick up a strip of material from a barge moving therebeneath and to raise the platform, a conveyor mounted on said platform to receive material from the bucket conveyor, conveyor means carried by the tower and movable therewith to receive material from the bucket conveyor and carry it to a transfer point at a fixed distance from the tower, and a conveyor extending beneath and substantially parallel to the path traveled by the transfer point during movement of the tower and adapted to receive material from the conveyor means and convey it to a predetermined discharge point.

4. Apparatus for unloading material from a barge which comprises four uprights arranged at the corners of a rectangle and forming a tower, two pairs of vertically spaced parallel arms of equal length, a substantially horizontal platform pivotally connected to the arms at one end, sliding connections between the arms and two adjacent uprights near the other end of the arms constructed for lateral movement of the arms but not vertical movement and sliding connections between the remaining two uprights and the arms intermediate the ends of the arms constructed for up and down movement of the arms but not lateral movement, whereby the platform is maintained horizontal and is movable in a substantially vertical direction, a bucket-type unloader fixed to said platform, means to move the tower in a sloping path on a bank of a body of water at substantially a right angle to the shore-line to a position in which a barge can pass beneath the unloader, means acting between the tower and a barge to move the barge beneath the unloader, means carried by the tower to guide the barge in a predetermined substantially straight path in fixed relation to the tower, means to lower said platform to position the unloader to pick up a strip of material from a barge moving therebeneath and to raise the platform, said unloader being constructed and arranged to pick up a string of material the width of the barge, a conveyor mounted on said platform to receive material from the unloader, a second conveyor having one end in fixed relation to the first conveyor to receive material therefrom and the other end in fixed relation to the tower, a third conveyor fixed to and movable with the tower to receive material from the second conveyor and carry it to a transfer point at a fixed distance from the tower, and a fourth conveyor extending beneath and substantially parallel to the path traveled by the transfer point during movement of the tower and adapted to receive material from the first conveyor means and convey it to a predetermined discharge point.

GEORGE E. BRANDON.

CERTIFICATE OF CORRECTION.

Patent No. 2,322,504.  June 22, 1943.

GEORGE E. BRANDON.

It is hereby certified that error appears in the printed specification of the above numbered patent requiring correction as follows: Page 4, first column, line 5, for "unloader" read --unloaded--; same line, for "strips" read --trips--; line 21, for "charges" read --changes--; and second column, line 26, claim 3, for "conenctions" read --connections--; page 5, first column, line 10, claim 4, for "string" read --strip--; and that the said Letters Patent should be read with this correction therein that the same may conform to the record of the case in the Patent Office.

Signed and sealed this 27th day of July, A. D. 1943.

(Seal)

Henry Van Arsdale,
Acting Commissioner of Patents.